United States Patent
Takeda et al.

(10) Patent No.: US 8,915,348 B2
(45) Date of Patent: Dec. 23, 2014

(54) BREAKAGE PREVENTION MECHANISM OF A TRANSFER APPARATUS AND TRANSFER APPARATUS USE OF THE BREAKAGE PREVENTION MECHANISM

(75) Inventors: Keisuke Takeda, Kanagawa (JP); Seiji Nakoshi, Kanagawa (JP); Takashi Koshimizu, Kanagawa (JP)

(73) Assignee: Aida Engineering, Ltd., Kanagawa (JP)

( * ) Notice: Subject to any disclaimer, the term of this patent is extended or adjusted under 35 U.S.C. 154(b) by 0 days.

(21) Appl. No.: 13/635,756

(22) PCT Filed: Mar. 18, 2011

(86) PCT No.: PCT/JP2011/056633
§ 371 (c)(1),
(2), (4) Date: Sep. 26, 2012

(87) PCT Pub. No.: WO2011/115269
PCT Pub. Date: Sep. 22, 2011

(65) Prior Publication Data
US 2013/0008761 A1 Jan. 10, 2013

(30) Foreign Application Priority Data
Mar. 18, 2010 (JP) .................. 2010-063033

(51) Int. Cl.
*B21D 43/11* (2006.01)
*B21D 43/05* (2006.01)
(52) U.S. Cl.
CPC .............. *B21D 43/11* (2013.01); *B21D 43/052* (2013.01); *B21D 43/055* (2013.01)
USPC ..................................................... 198/339.1

(58) Field of Classification Search
CPC ...... B21D 43/05; B21D 43/11; B21D 43/052; B21D 43/055
See application file for complete search history.

(56) References Cited

U.S. PATENT DOCUMENTS

| | | | | |
|---|---|---|---|---|
| 4,761,986 A | * | 8/1988 | Maunz et al. | 72/405.09 |
| 5,152,660 A | * | 10/1992 | Bierlein | 269/7 |
| 5,385,040 A | * | 1/1995 | Michael et al. | 72/405.1 |
| 6,223,582 B1 | * | 5/2001 | Hofele et al. | 72/405.09 |
| 6,314,786 B1 | * | 11/2001 | Hofele et al. | 72/405.11 |
| 6,612,229 B2 | * | 9/2003 | Hofele et al. | 100/207 |
| 7,748,249 B2 | * | 7/2010 | Shiroza | 72/422 |
| 8,424,359 B2 | * | 4/2013 | Theis et al. | 72/420 |

(Continued)

FOREIGN PATENT DOCUMENTS

| | | |
|---|---|---|
| EP | 1358952 A2 | 11/2003 |
| JP | 55-60992 U | 4/1980 |

(Continued)

*Primary Examiner* — Ramya Burgess
*Assistant Examiner* — Thomas Randazzo
(74) *Attorney, Agent, or Firm* — McDermott Will & Emery LLP

(57) ABSTRACT

A breakage prevention mechanism includes a pair of arms which is synchronized and moves approximately parallel, and a crossbar bridged between the top end of the arms. Both end of the crossbar and the arm are connected pivotably around two axis. Both end of the crossbar are configured to be slidable against the arm in X axis direction. A plunger is placed between both end of the crossbar and arm, which protects the crossbar by restraining the pivoting and the sliding of both in the normal condition and releasing the restraint when the unintended force is given.

15 Claims, 14 Drawing Sheets

(56) References Cited

U.S. PATENT DOCUMENTS

| | | | |
|---|---|---|---|
| 2002/0088266 A1* | 7/2002 | Hofele et al. | 72/405.01 |
| 2003/0066331 A1* | 4/2003 | Thudium et al. | 72/405.13 |
| 2007/0062243 A1* | 3/2007 | Childs et al. | 72/405.11 |
| 2012/0114451 A1* | 5/2012 | Nishida et al. | 414/225.01 |

FOREIGN PATENT DOCUMENTS

| | | |
|---|---|---|
| JP | 62-105733 U | 7/1987 |
| JP | 11-221636 A | 8/1999 |
| JP | 2005-211935 A | 8/2005 |

* cited by examiner (a)

(b)

(a)

(b)

(c)

(a)

(b)

(a)

(b)

(a)
(b)

(a)

(b)

(a)

(b)

BREAKAGE PREVENTION MECHANISM OF A TRANSFER APPARATUS AND TRANSFER APPARATUS USE OF THE BREAKAGE PREVENTION MECHANISM

CROSS REFERENCE TO PRIOR APPLICATIONS

This application is a U.S. National Phase application under 35 U.S.C. §371 of International Application No. PCT/JP2011/056,633, filed on Mar. 18, 2011 and claims benefit of priority to Japanese Patent Application No. 2010-063033, filed on Mar. 18, 2010. The International Application was published in Japanese on Sep. 22, 2011 as WO 2011/115269 A1 under PCT Article 21(2). All these applications are herein incorporated by reference.

FIELD OF THE INVENTION

The present invention relates to a breakage prevention mechanism of a transfer apparatus provided in a press machine and a transfer apparatus using thereof. For further details, it relates to a breakage prevention mechanism of a crossbar system transfer apparatus and a transfer apparatus using thereof.

DESCRIPTION OF BACKGROUND ART

A transfer apparatus which transfers a work between a plurality of press machines or dies arranged in series is known. As transfer apparatuses like these, there are an arm system transfer apparatus which swings an arm installed in a column etc. attached between press machines and a feed bar system transfer apparatus in which a feed bar installed in a rail etc. attached between press machines is moved horizontally or vertically. Therefore, a work is held and transferred by these arms or feed bars of the transfer apparatus. Moreover, a cross bar system transfer apparatus is known, in which a pair of transferring members (arms or feed bars) is arranged in the both sides (right and left), and a work is held by a cross bar bridged between the pair of transferring members.

In such a cross bar system transfer apparatus, since the cross bar is moved by synchronizing a pair of transferring members, a heavy strain will be put on the transferring members, the cross bars etc., and the weakest component or the most loaded component may possibly deformed or damaged, when displacement occurs between the pair of transferring members. As the cause of such displacement, the out of synchronization of the pair of the transferring members, or the contact of die etc. with a component of a press machine occurred during the movement of the transferring member can be cited.

In Patent Document 1, a transfer feeder equipped with a servo drive means which synchronizes feed bars (feed carriers) by an electrical control is disclosed, in which when an abnormality occurs in a control portion, it is switched automatically to a cam drive means which synchronizes them mechanically.

In Patent Document 2, a transfer feeder equipped with a crossbar which can easily avoid interference with the die of a press machine when transferring a work is disclosed.

In Patent Document 3, a transfer apparatus is disclosed, which comprises right and left drive devices capable of driving respectively independently, a crossbar bridged between those drive devices, a length compensation device which allows the expansion and contraction of the crossbar, and a cardan joint which connects the end portion of the crossbar and the drive device corresponding thereto. The length compensation device comprises an external tube member and an internal member. The internal member is connected to the lever of one drive device by the cardan joint. The external tube member is connected to another drive device through the cardan joint. The internal member slides inside of the external tube member in an axis direction, making the length of the crossbar extendable and contractible. The cardan joint device allows the crossbar to pivot around two axes, namely around a Y axis (transfer direction) and a Z axis (vertical direction) by each drive mechanism.

PRIOR ART DOCUMENTS

Patent Documents

Patent Document 1: Japanese published Patent Document H11-221636
Patent Document 2: Japanese published Patent Document 2005-211935
Patent Document 3: U.S. Pat. No. 6,612,229B2 specification

DESCRIPTION OF THE INVENTION

Problems to be Solved

The present invention is to provide a breakage prevention mechanism of a crossbar system transfer apparatus which prevents the deformation or breakage of a transfer member or a crossbar etc. even if the displacement of a pair of transfer members of the transfer apparatus occurs by power shutdown or a contact with a die etc. of a press machine etc. and to provide the transfer apparatus using thereof. Further, the present invention is to provide a crossbar system breakage prevention mechanism and a crossbar system transfer apparatus, which can transfer a work while being inclined right or left, or back or forth with a simple configuration, and which can make the work inclined right or left, or back or forth or can set it back on the way of transfer.

Solution

The breakage prevention mechanism of the transfer apparatus of the present invention is characterized in that it comprises a pair of transferring members that is synchronized and moves approximately parallel, and a crossbar connected with the pair of transferring members so as to be bridged between the pair of transferring members, in which the both ends of the crossbar and the transferring member express a pivoting state being pivotable around a Z axis of approximately vertical direction and a Y axis of a work transfer direction, and being approximately centered at the connection portion of the transferring member and the crossbar, and at the same time, at least one among the both ends of the crossbar in the connection portion expresses a sliding state being slidable in an X axis of the axis direction of the crossbar to the transferring member.

As the breakage prevention mechanism like this, it is preferable that only one end of the crossbar is connected slidably in the X axis to the transferring member, and the other end being not slidable. However, it may be that the both ends of the crossbar are respectively connected slidably in the X axis to the transferring member.

It is preferable that the both ends of the crossbar are connected slidably, a fixation retention mechanism which constrains the slide of the both in a normal state and releases the constraint by an external force is interposed between at least one end of the crossbar and the transferring member to which one end thereof is connected.

Moreover, the fixation retention mechanism is interposed between the one end of the crossbar and the transferring member to which the one end thereof is connected, and the other end and the transferring member to which the another end is connected are further preferable to be slidable always.

However, the fixation retention mechanism may be respectively interposed between the both ends of the crossbar and the transferring member to which those end portions are connected.

The fixation retention mechanism may further constrains the pivoting of the both in a normal state, and that releases the constraint by an external force. Further, in the fixation retention mechanism expressing the normal state, a sensor to detect the displacement of the transferring member and/or the crossbar from the normal state may be preferably equipped.

The second aspect of the breakage prevention mechanism of the present invention comprises a pair of transferring members that is synchronized and moves approximately parallel, and a crossbar connected with the pair of transferring members so as to be bridged between the pair of transferring members, in which the transferring member and the crossbar express a normal state being fixed each other, the crossbar and the transferring member express a pivoting state being pivotable each other approximately centered at the connection portion, the crossbar expresses a sliding state being slidable in the axis direction of the crossbar to the transferring member in the connection portion, and in which the transition from the normal state to the pivoting state and/or the sliding state is made by receiving a predetermined external force.

As the second aspect of the breakage prevention mechanism like this, it is preferable that a connecting member to connect the transferring member and the crossbar is further equipped.

As the breakage prevention mechanism equipped with the connecting member, the connecting member may comprises a transferring member connecting portion connected to the transferring member and a crossbar connecting portion connected to the crossbar, in which the pivoting state is the state where the transferring member connecting portion and the crossbar connecting portion pivot, and the sliding state is the state where the transferring member connecting portion and the transferring member, the crossbar connecting portion and the crossbar, or the transferring member connecting portion and the crossbar connecting portion slide.

Moreover, the connecting member may comprises a transferring member connecting portion connected to the transferring member and a crossbar connecting portion connected to the crossbar, in which the pivoting state is the state where the transferring member and the transferring member connecting portion, or the crossbar and the crossbar connecting portion pivot, and the sliding state is the state where the transferring member connecting portion and the transferring member, the crossbar connecting portion and the crossbar, or the transferring member connecting portion and the crossbar connecting portion slide.

The transferring member and the crossbar in the normal state are preferable to be fixed by a plunger, a shear pin, or a frictional force. When the connection member is used, the transferring member connecting portion and a crossbar connecting portion and/or the crossbar connecting portion and the transferring member, and/or crossbar connecting portion are fixed by a plunger, a shear pin or each frictional force. Further, a sensor to detect the displacement of the transferring member and/or the crossbar from the normal state may be equipped.

As a specific structure, it is preferable that a pivoting block is provided so as to be pivotable around the Z axis of an approximately vertical direction to the transferring member, and a slide block is fixed to the end portion of the crossbar, in which a through groove extending in the X axis direction to which the crossbar is extended is formed in either the pivoting block or the slide block, and a pivoting support portion is provided in another side, while the slide member is supported by the pivoting support portion so as to be pivotable, the slide member is fitted to the through groove so as to be slidable.

The crossbar system transfer apparatus of the present invention is characterized in that it is equipped with any of the above described breakage prevention mechanism.

Effect of the invention

In the breakage prevention mechanism of the crossbar system transfer apparatus of the present invention, the transfer can be performed while accommodating the misalignment even if the misalignment of the phase of the right and left transferring member occurs, because the transferring member and the both ends of the crossbar are pivotable, and further are slidable in the X axis. Hence, breakage can be prevented. Moreover, it is possible to transfer a work whose right and left are inclined back and forth, or above and below, by intention the transfer direction axis direction) or height, direction (Z axis direction) of the right and left transferring member.

As the breakage prevention mechanism, the positioning of the work becomes accurate when only one end of the crossbar is connected to the transferring member being slidable in the X axis direction, and the other end being unslidable, since the position of the one end is defined. On the other hand, the displacement can be accommodated when the both ends of the crossbar are connected to the transferring member to be slidable in the X axis direction, even if the displacement of the right and left transferring member is large.

When a fixation retention mechanism which constrains the slide of the both in the normal state and releases the constraint by an external force is interposed between at least one end of the crossbar and the transferring member to which one end thereof is connected, the crossbar and the transferring member integrally move stably in the state where the fixation retention mechanism is working. And, if an excessive external force is applied, the constraint by the fixation retention mechanism is released, and it shifts to the sliding state to prevent the breakage.

Particularly, when the fixation retention mechanism is interposed between the one end of the crossbar and the transferring member to which the end thereof is connected, and the other end and the transferring member to which the another end is connected slidably, it is possible to transfer the work in an inclined state, since the both ends of the crossbar are connected pivotably, and the other end side is connected slidably. Further, even if an excessive external force is applied to the crossbar by a cause that the displacement of the right and left transferring member exceeds a designed slidable range, it is possible to protect the crossbar etc. because the fixation retention mechanism of one end side shifts to the sliding state.

When the fixation retention mechanism is respectively interposed between the both ends of the crossbar and the transferring member to which those end portions are connected, it is difficult to transfer the work in an inclined state, but in the normal state, the transfer of the work will be stable because the length between the both ends will be defined. Moreover, when the fixation retention mechanism further constrains the pivoting of the both in the normal state and its constraints can be released by an external force applied in the normal state, the transfer of the work will further be stable, since the length and the angle of the crossbar are fixed in the normal state. In addition, when an excessive external force is applied by the cause that the displacement of the right and left transfer members exceeds a designed value and the like, the crossbar etc. will protected because the fixation retention mechanism shifts to the pivoting state or the sliding state from the normal state in an case.

In the case that the sensor to detect the displacement of the transferring member and/or the crossbar from the normal state is equipped, the displacement are immediately displayed or transmitted, when a relative movement or a relative movement exceeding the range tolerated in the design occurs. Thereby, the strict synchronization control of the right and left transferring member can be performed. The sensor may be attached only in the side where there is the fixation retention mechanism. It is because the shift from the fixed state to relative movement state is assumed.

In the second aspect of the crossbar system transfer apparatus of the present invention, the transferring member and the cross bar express a normal state being fixed each other, the crossbar and the transferring member express a pivoting state being pivotable each other approximately centered at the connection portion, and the crossbar expresses a sliding state being slidable in the axis direction of the crossbar to the transferring member in the connection portion, and the transition from the normal state to the pivoting state and/or the sliding state is made by receiving a predetermined external force, the normal state shift to the pivoting state and/or the sliding state when the force is applied to the transferring member and the crossbar due to the displacement of the transferring member. Thereby, it is possible to prevent the deformation and the breakage of the transferring member, the crossbar etc., which are the weakest components or the most loaded components. Moreover, in the normal state in which the displacement of the transferring member does not occur, the positioning of a work holding mechanism provided in the crossbar and the replacing of the crossbar is easy because the posture of the crossbar is constant since the transferring member and the crossbar are fixed mutually.

In the breakage prevention mechanism of the work transfer apparatus of the present invention, where a connecting member is further equipped, the assembly and design thereof are easy. Particularly, when the connecting member comprises a transferring member connecting portion connected to the transferring member and a crossbar connecting portion connected to the crossbar, the pivoting state being the state that the transferring member connecting portion and the crossbar connecting portion pivot, the sliding state being the state that the transferring member connecting portion and the transferring member, the crossbar connecting portion and the cross bar, or the transferring member connecting portion and the crossbar connecting portion slides, the normal state quickly shifts to the pivoting state and/or the sliding state, even if the displacement of the transfer member occurs.

Moreover, in the case that the pivoting state is the state where the transferring member and the transferring member connecting portion, or the crossbar and the crossbar connecting portion pivot, and that the sliding state is the state where the transferring member connecting portion and the transferring member, the crossbar connecting portion and the crossbar, or the transferring member connecting portion and the crossbar connecting portion slide, it also shifts quickly to the pivoting state and/or the sliding state.

In the normal state, when the transferring member and the crossbar are fixed by a plunger, a shear pin, or each frictional force, it is easy to establish a condition from the normal state to the pivoting state and/or the slide state, and also the recovery thereof can be done easily. Further, when a sensor to detect the displacement of the transferring member and/or the crossbar from the normal state is equipped, a user can know the displacement immediately, and can perform the halt, adjustment of the press machine and the transfer apparatus efficiently.

In the breakage prevention mechanism, in which a pivoting block is provided so as to be pivotable around the Z axis of an approximately vertical direction to the transferring member, a slide block is fixed to the end portion of the crossbar, a through groove extending in the X axis direction to which the crossbar is extended is formed in either the pivoting block or the slide block, and a pivoting support portion is provided in another side, where the slide member is supported by the pivoting support portion so as to pivotable, and the slide member is fitted to the through groove so as to be slidable, the slide member doubles as the element of the slide connection and the pivot connection. Hence the mechanism can be simplified and the manufacture is also easy.

Since the crossbar system transfer apparatus of the present invention is equipped with the above described breakage prevention mechanism, when the difference occurs in the phase of the right and left drive mechanism, it shifts to the pivoting state or the sliding state, making it possible to prevent the breakage of the crossbar etc.

BRIEF DESCRIPTION OF THE DRAWINGS

FIG. 10 is a IX-IX line cross-sectional view of FIG. 9a.

FIG. 15 is a XV-XV line cross-sectional view of FIG. 14a.

BEST MODE FOR CARRYING OUT THE INVENTION

Figure 1:
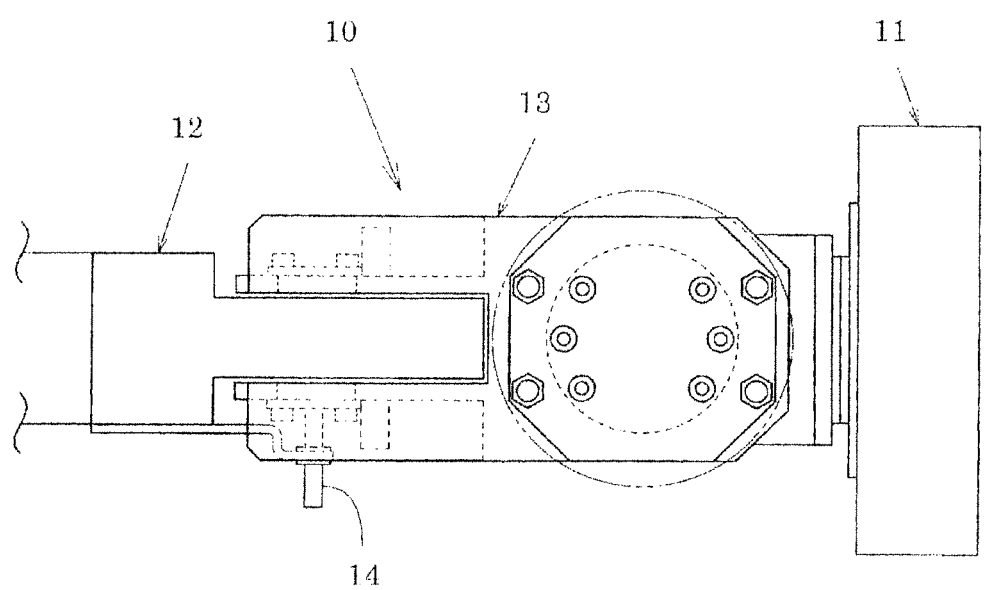
FIGS. 1a, 1b are a top view and a side view showing a part of one embodiment of the breakage prevention mechanism of the present invention.
Figure 1:
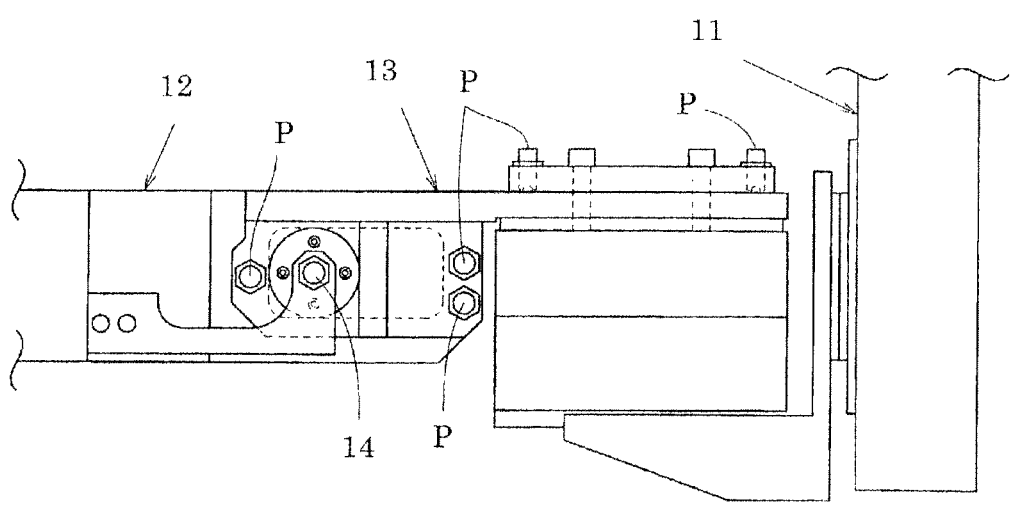

A breakage prevention mechanism (crossbar connection device) 10 of FIGS. 1a, 1b is used for an arm system transfer apparatus equipped with a pair of arms (transferring member) 11 (only one side is shown in the figure), a crossbar 12 bridged between those arms 11, and an adapter (connection member) 13 connecting those. This breakage prevention mechanism 10 expresses a normal state in which the arm 11 and the crossbar 12 are fixed by the adapter 13 (refer to FIGS. 1a, 1b), a first pivoting state in which the arm 11 and the crossbar 12 become pivotable mutually in a horizontal direction, a second pivoting state in which the arm 11 and the crossbar 12 become pivotable mutually in a vertical direction approximately centered at the adapter 13, and a sliding state in which the crossbar 12 becomes slidable in the shaft direction of the crossbar to the adapter 13. The reference numeral P of FIG. 1 is a fixation retention mechanism which fixes the arm 11, the adapter 13, and the crossbar 12 etc. until an excessive force is applied, and allows them to relatively move when the excessive force is applied. In this embodiment, a plunger is used. Moreover, the reference numeral 14 of FIG. 1 is a sensor of displacement, and a proximity switch etc. is used therefor.

Figure 2:
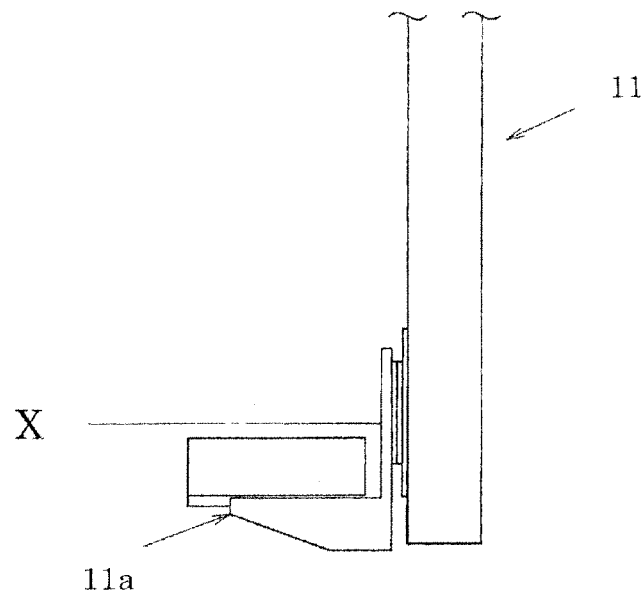
FIG. 2a is a partial cross-sectional side view of the arm of FIG. 1, and FIGS. 2b, 2c are respectively a partial cross-sectional top view and a side view of the crossbar of FIG. 1.
Figure 2:
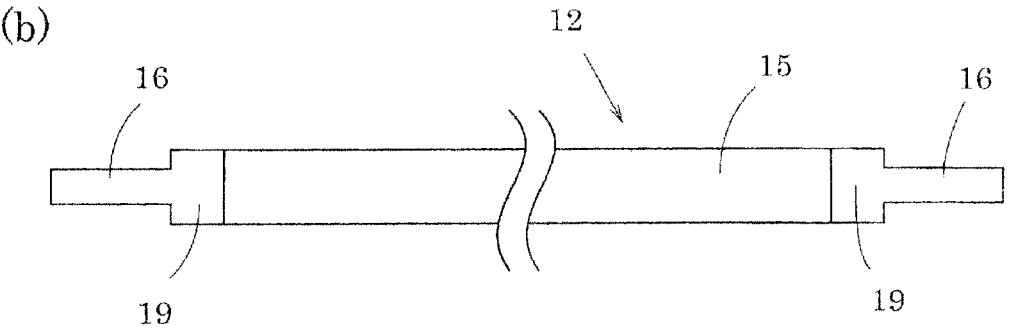
Figure 2:
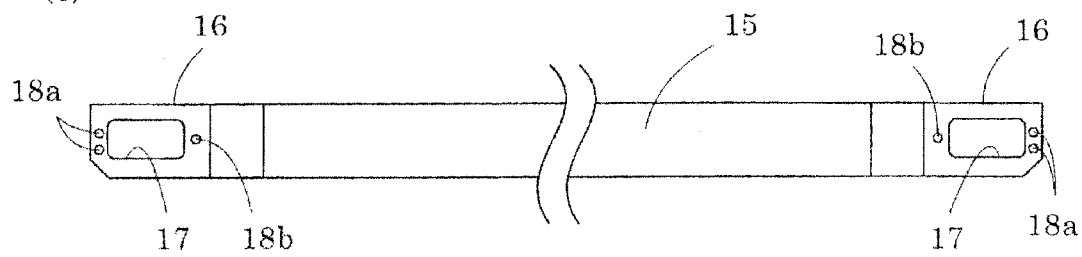

As shown in FIG. 2a, the arm 11 swings centered on the base end (upper side of FIG. 2a) as a shaft, and an adapter connection portion 11a to connect the adapter 13 is provided so that it rotates being centered at the axis X lengthen in right and left (hereinafter referred to as an X axis) facing the transfer direction of a work. Thereby, the crossbar 12 connected through the adapter connection portion 11a and the adapter 13 can always transfer the work in a same direction or can freely set the inclination of the work, even if the arm 11 swings. The adapter connection portion 11a may be made so as to be always hung downward by its own weight, or may be made so as to be swung in synchronization with the swing of the arm 11 by a motor etc. maintaining the lower face of the crossbar 12 always facing downward. Further, in order to easily place the work on a die or to take out it from the die in concert with the timing of the transfer of the work, it may be tilted as much as a predetermined angle around the X axis by a motor drive etc.

Figure 4:
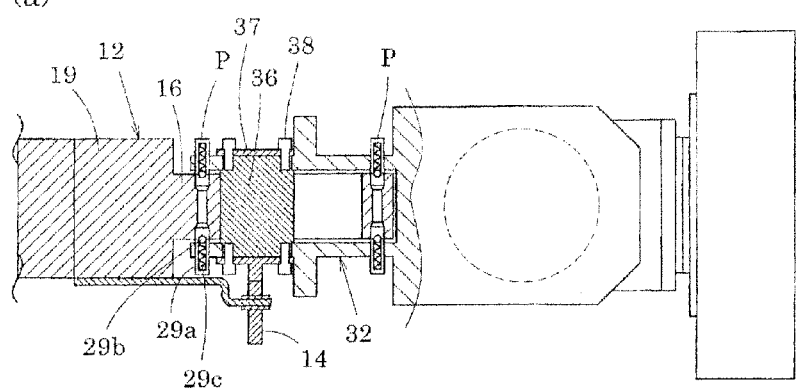
FIGS. 4a, 4b are respectively partial cross-sectional side views showing the normal state and the sliding state of the adapter of FIG. 1.
Figure 4:
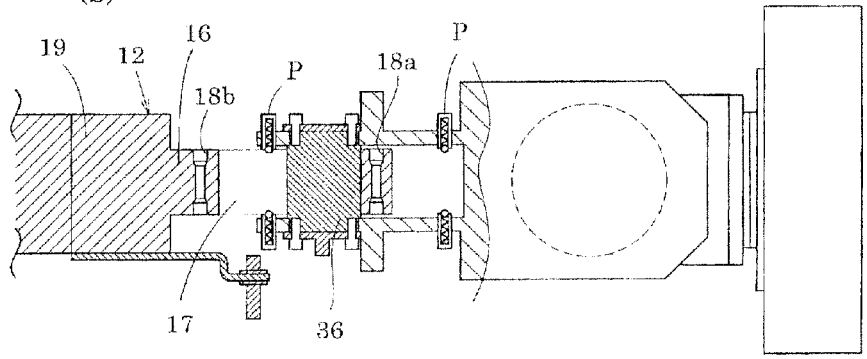
Figure 6:
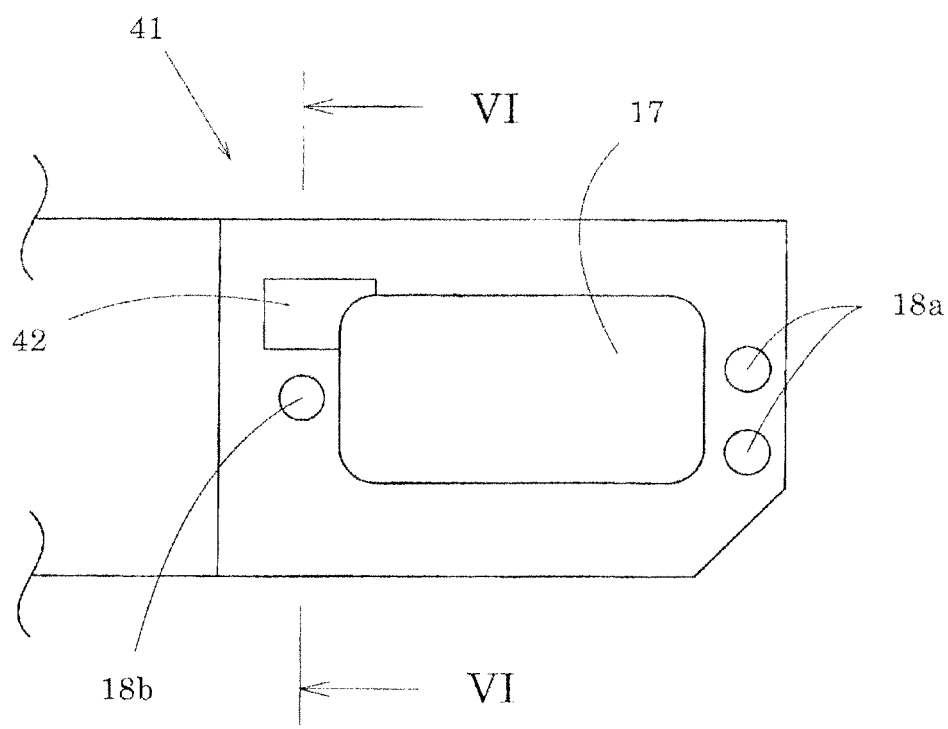
FIGS. 6a, 6b are respectively a side view, and a VI-VI line cross-sectional view showing the other embodiment of the crossbar of the breakage prevention mechanism of the present invention.
Figure 6:
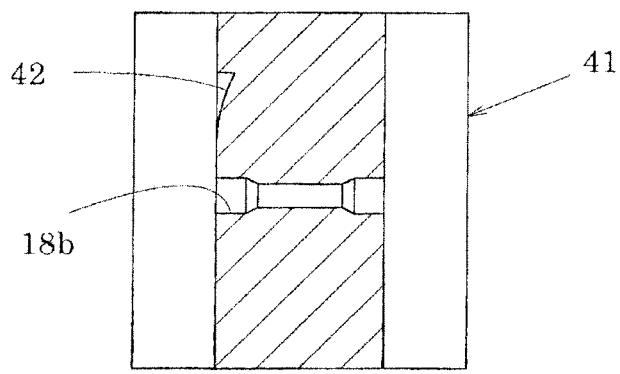
Figure 8:
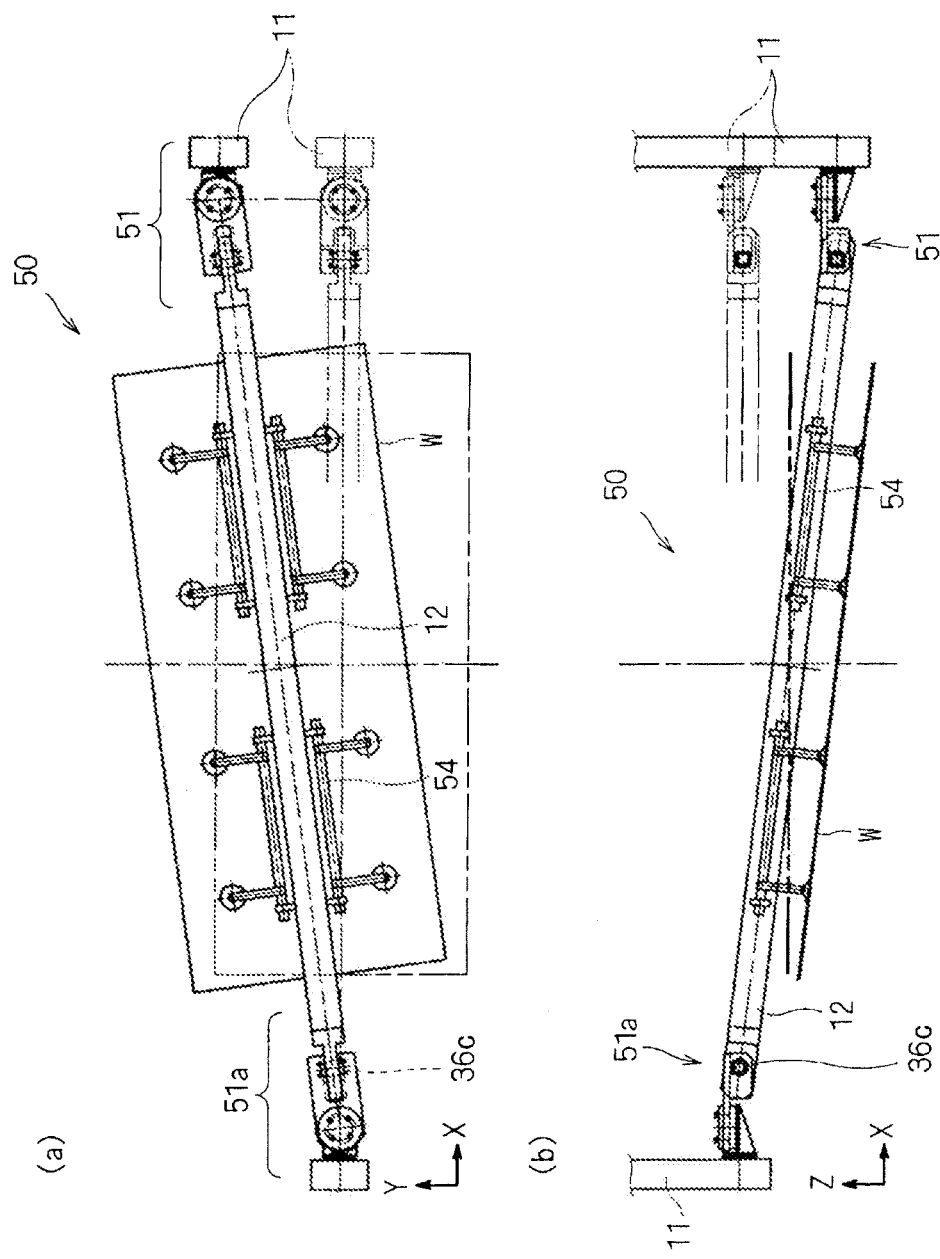
FIGS. 8a, 8b are respectively a substantial plan view and a substantial front view of the transfer apparatus of FIG. 7 of the present invention.

As shown in FIGS. 2b, 2c, and FIG. 6b, the crossbar 12 is a rectangular or squared column-like as a whole, and is equipped with a rectangular column-like body 15 and a crossbar end portion 19 (slide block) having a protrusion 16 reduced in a direction of width (right and left) in the both end thereof. As shown in FIGS. 2b, 2c, the body 15 is made to be a light weight member such as a rectangular pipe. The crossbar end portion 19 is made to be a block-like member whose strength is high, and may be fitted in and fixed to the end portion of the body 15. A rectangular through hole 17 penetrating in a width direction is formed (refer to FIG. 6a) in the protrusion 16. This through hole 17 is formed to be larger than a later described shaft member 36 to be inserted into this through hole. Further, in the front end of the protrusion 16, two plunger holes 18a engaging with a ball of a plunger (reference numeral P of FIGS. 4a, 4b) attached to the hem portion of the adapter later described are formed, and in the base end of the protrusion, one plunger hole 18b is formed. These two plunger holes 18a and the one plunger hole 18b are formed so as to be on either side of the through holes 17. In the body 15 of the crossbar 12, a work holder (refer to reference numeral 54 of FIG. 8) such as a vacuum cup, an electromagnet for holding the work etc. is provided.

Figure 3:
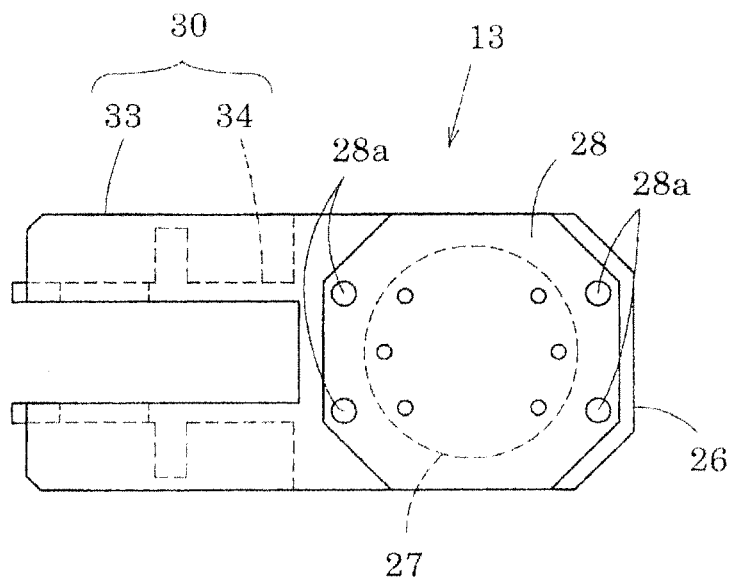
FIGS. 3a, 3b are respectively a top view, and a side view showing the adapter of FIG. 1.
FIG. 3c is a side view in which the axis member is inserted in to the adapter.
Figure 3:
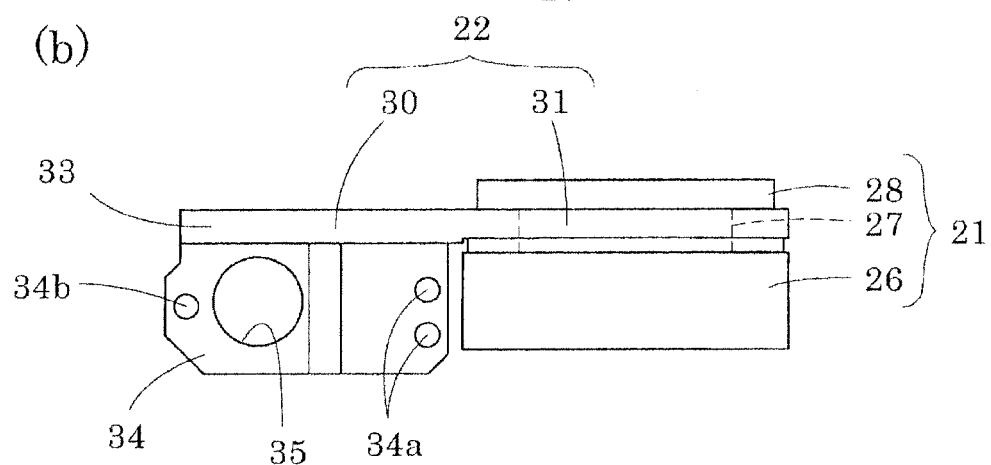
Figure 3:
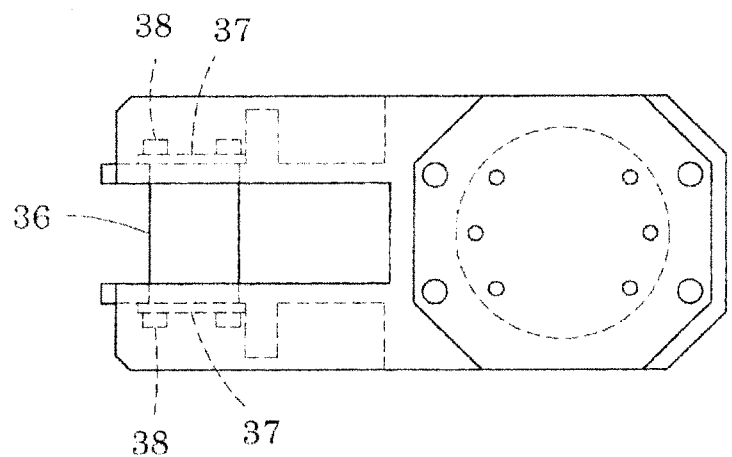

As shown in FIGS. 3a, 3b, and FIG. 4a, the adapter 13 is equipped with an arm connection portion (transfer member connection portion) 21 and a crossbar connection portion (pivoting block) 22 connected to the arm connection portion 21 so as to be pivotable around the vertical axis (Z axis). The arm connection portion 21 comprises a rectangular parallelepiped base portion 26 of which the lower end is held by the arm 11, a rotation shaft 27 provided in the upper surface of the base portion, and a plate-like flange portion (end plate) 28 fixed to the upper surface of the rotation shaft. A gap in which a rotating disc 31 of the crossbar connection portion 22 can rotate is formed, between the base portion 26 and the flange portion 28. The rotating disc 31 is provided rotatably around the rotating shaft 27. In the outer peripheral edge of the flange 28, a plurality of screw holes 28a to fix the plunger P is formed. And, in this embodiment, there are four screw holes 28a which is screwed together with the plunger P. Moreover, in the upper surface of the rotating disc 31, a plunger hole (hole or recessed portion) engaging with the ball (refer to reference numeral 29h of FIG. 4a) of the front end of the plunger P or a pin etc. is formed. Moreover, the rotation shaft 27 of the crossbar connection portion 22 is fixed to the base portion 26 by a screw. However, it may be integrally molded.

As shown in FIG. 1b, the arm connection portion 21 and the crossbar connection portion 22 are connected in a fixed state by screwing the plunger P together with the screw hole 28a of the flange portion 28, and engaging the ball of the plunger with the plunger hole. Here, as shown in FIG. 4a, the plunger P comprises a cylindrical body 29a, in which a screw thread is formed in the outer periphery, a ball 29b or a pin inserted therein being movable vertically, and a spring 29c energizing the engaging body of the ball or the pin etc. in a front end direction. The front end of the ball 29b or the pin is configured so as to protrude from the opening of the front end of the body 29a. Hence, by applying a predetermined external force to the ball 29b, the ball 29b is housed in the body 29a, and the engaging of the ball 29b and the plunger hole becomes disengaged.

Stated differently, if the arm connection portion 21 fixed by the plunger P and the crossbar connection portion 22 receives a predetermined force (torque around the Z axis) or more, the ball of the plunger departs from the plunger hole of the rotating disc 31, and the rotating disc 31 becomes rotatable to the arm connection portion 21. Thus, the state that the crossbar connection portion 22 connected with the crossbar 12, and the arm connection portion 21 connected with the arm 11 become rotatable around the Z axis is the first pivoting state in which the arm 11 and the crossbar 12 mutually rotate in a horizontal direction approximately centered at the adapter 13. On the one hand, even if it becomes the pivoting state, recovery work to the normal state can be easily performed by rotating the rotating disc 31 so that the ball of the plunger is inserted again into the plunger hole of the rotating disc 31.

The crossbar connection portion 22 comprises a connection body 30 held by the crossbar, and the rotating disc 31 connected rotatably to the arm connection portion 21, provided protrudingly from the connection body. The rotating disc 31 is arranged it the upper surface of the base portion 26 as described above, and a plunger hole with which the ball of the plunger P screwed together with the screw hole 28a of the flange portion 28 engageably and detachably engages in the upper surface.

As shown in FIGS. 3a, 3b, the connection body 30 comprises a pair of support portions 33 mutually extending from the rotating disc 31 in parallel being spaced apart, and a pair of hem portions 34 extending downward from the support portion 33. In the center of the hem portion 34, a circular through hole 35 penetrating in a width direction is formed. The both ends of a shaft member 36 bridging the pair of hem portions 34 are rotatably inserted into the through hole (rotation support portion) 35. Moreover, in the base end side (arm side) of the hem portion 34, two screw holes 34a to fix the plunger (reference numeral P of FIG. 4a) are formed, in the front end side, one screw hole 34b is formed. The balls of these plungers P engage with plunger holes 18a, 18b of the protruding portion 16 of the crossbar 12 engageably and detachably. In the embodiment shown in FIGS. 4a, 4b, a through hole penetrating the protruding portion 16 is formed, the portions opened in the both surfaces of the protruding portion 16 of the through are made to be the plunger holes 18a, 18b.

The both ends 36a of the shaft member 36 are column-like, and are attached to the through hole 35 of the hem portion 34 rotatably by a mounting plate 37 and a screw 38 (refer to FIG. 4a). On the one hand, the center portion (slide member) 36b of the shaft member 36 is fitted slidably in the rectangular through hole 17 of the crossbar 12. Thereby, the shaft member 36 is rotatable around the Y axis to the adapter 13 and is slidable to the crossbar 12 in the X axis direction. In addition, the both ends of the shaft member 36 is made to be fixed to the hem portion 34, and a rectangular parallel piped slide member sliding in the through hole 17 may be fitted in rotatably around the center portion of the shaft member 36. In this case, the shaft member 36 acts as a rotation support portion which supports the slide member rotatably.

The connection of the crossbar connection portion 22 and the crossbar 12 is performed by inserting the protruding portion 16 of the crossbar 12 between the support portions 33 of the crossbar connection portion (refer to FIG. 4a). At this point, the shaft member 36 is inserted into the through hole 35 of the crossbar, after the shaft member 36 is inserted into the through hole 17 of the protruding portion 16. And the crossbar connection portion 22 and the crossbar 12 are connected and fixed by mating the screw holes 34a, 34b of the crossbar connection portion 22 and the plunger holes 18a, 18b of the crossbar and inserting the plunger P.

In such a state, predetermined force or more is received in a direction that the crossbar 12 is pulled or is rotated vertically, the balls of the plunger P disengage from the plunger holes 18a, 18b of the crossbar 12 (refer to FIG. 4b). Thereby, the shaft member 36 becomes movable in a longitudinal direction within the range of the through hole 17 of the crossbar, and the crossbar 12 becomes slidable to the arm 11 connected to the adapter 13 (sliding state). Moreover, after the balls of the plunger disengage from the plunger holes, the shaft member 36 becomes rotatable not only in the longitudinal direction, but also rotatable in the through hole 35 of the hem portion 34, and the arm 11 and the crossbar 12 become mutually rotatable in a vertical direction (around the Y axis direction) approximately centered at the adapter 13 (the second pivoting state). Stated differently, the degree of freedom increases without completely separating the crossbar 12 and the crossbar connection portion 22.

Figure 5:
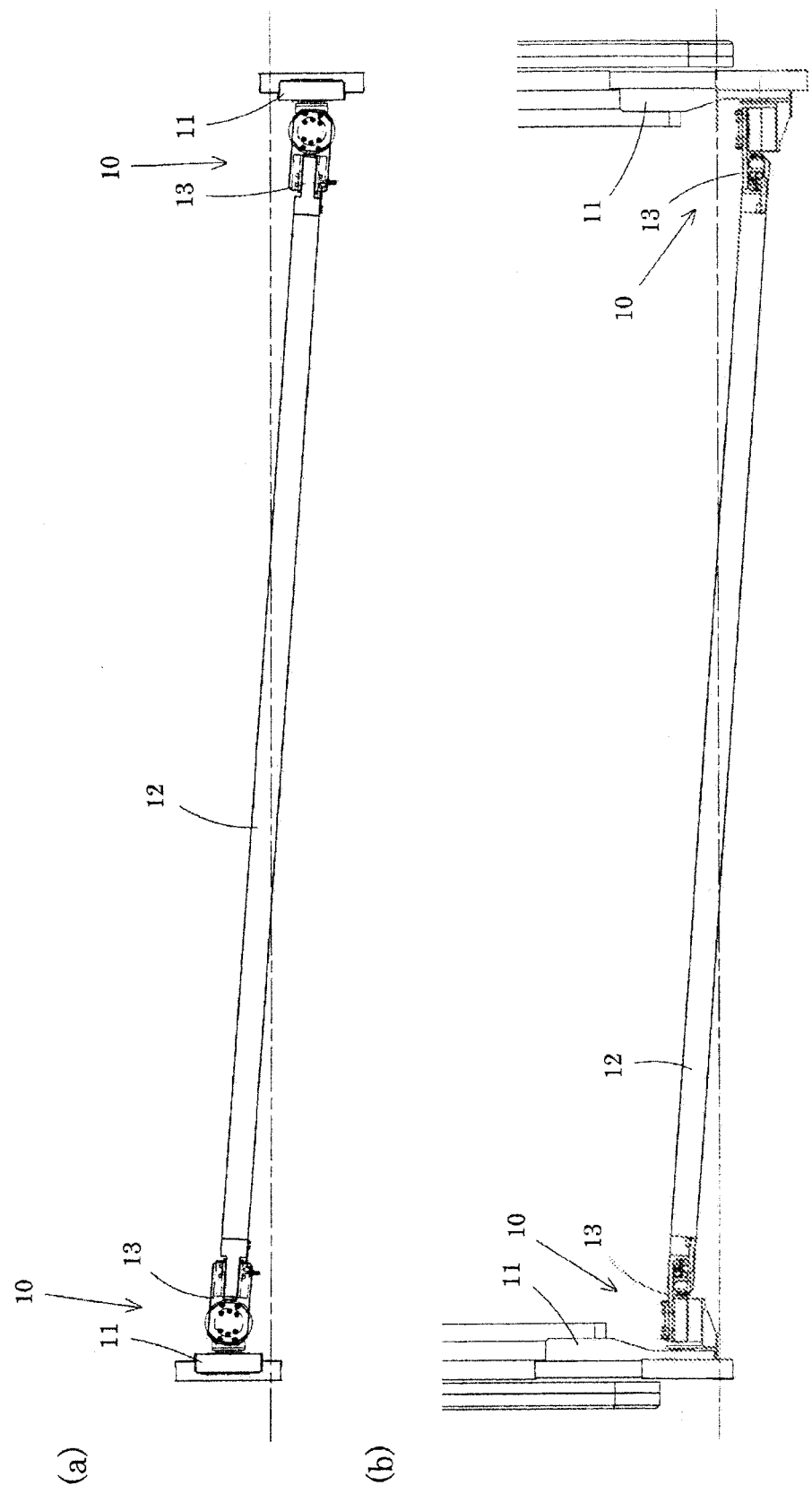
FIGS. 5a, 5b are respectively a top view and a side view showing the displacement of the breakage prevention mechanism of the present invention.

As shown in FIGS. 5a, 5b, the breakage prevention mechanism 10 is interposed to the portion which connects the right and left end portions of the crossbar 12 and the right and left arms 11 of the drive device of the work transfer device. In addition, the one end portion of the crossbar 12 may be connected to the arm 11 through the above described breakage prevention mechanism 10, and another end may be connected to the arm through a connection mechanism such as all universal joint, which rotatably connects around two axes which do not slide.

On the one hand, to refix the crossbar 12 and the crossbar connection portion 22, the crossbar 12 or the cross bar connection portion 22 is operated so that the balls 29b of the plungers P reengage with the plunger holes 18a, 18b, after the phase of the right and left arms is matched. Thereby, recovery work to the normal state can be performed simply.

Since being configured like this, when the pair of the arms 11 moving synchronously generates a displacement as FIG. 5a (displacement in a horizontal direction), FIG. 5b (displacement in a vertical direction), the breakage prevention mechanism 10 of FIG. 1 becomes a first pivoting state in which the arm connection portion 21 and the cross bar connection portion 22 rotate, and/or a second pivoting state in which the crossbar 12 and the crossbar connection portion 22 rotate, and/or a sliding state in which the crossbar connection portion 22 and the crossbar 12 slide. Hence, the breakage of the crossbar etc. can be avoided. In addition, the displacement is caused by, for example, the out of synchronization of a motor etc. driving the right and left arms 11 and making the swing angle of the arm 11 misaligned (out of synchronization) etc.

In the breakage prevention mechanism 10 of FIGS. 1a, 1b, when the crossbar connection portion 22 and the crossbar 12 rotate or slide, a sensor 14 detects it. And, the detected signal is sent to a control device to stop the drive device of the arm 11 and the press machine. Thereby, troubles such as the displacement of mounting position of a work W on a die are prevented. In addition the press machine will be immediately shut down, but it is preferably that the drive device to drive the arm 11 is stopped after the crossbar 12 holding the work W is returned to the safe position particularly to a reference position. In FIGS. 1a, 1b, the sensor 14 is provided concentrically with the shaft member (refer to reference numeral 36 of FIG. 4), but it is preferable that the sensor 14 and a dog to be the object of detection are decentered from the center of the shaft member 36. In this case, if the crossbar connection portion 22 and the crossbar 12 relatively slightly rotate, it is sensitively detected. Hence, it is further preferable.

The recovery work of the breakage prevention mechanism 10 from the sliding state, and/or the first pivoting state, the second pivoting state can be performed simply by rotating and/or sliding any of the components.

In the breakage prevention mechanism 10 of FIG. 1, the plunger is used for holding the normal state, but other may be used. For, example, in place of the plunger, a shear pin sheared by a large force applied thereto may be used. In this case, the recovery work from the pivoting state and the sliding state to the normal state can be done by replacing the sheared pin with a new shear pin. Further, it may be made to hold the normal state by a friction force. In other words, the base portion 26 of the arm connection portion and the flange 28 and the rotating disc 31 may be tightly contacted, or the support portion 33 of the crossbar connection portion and the crossbar 12 may be tightly contacted. And, a plurality of means to hold the normal state such as the plunger and the shear pin, the plunger and the friction force or the shear pin and the friction force may be combined.

A crossbar 41 of FIGS. 6a, 6b is that which can be used in place of the crossbar 12 of FIGS. 1a, 1b, and that in which a recovery groove 42 of the plunger is formed. This recovery groove 42 is a groove for leading the ball of the plunger or the tip of the pin in the through hole 17 of the crossbar to the plunger holes 18a, 18h. The recovery groove is made to be taper-like or curve shaped toward the plunger hole so that the ball of the plunger or the tip of the pin is pushed in to the plunger body from the edge of the through hole 17. In FIGS. 6a, 6b, the recovery groove 42 which leads to the plunger hole 18b of the base end side of the crossbar end portion 19 is disclosed, but it may be provided in the vicinity of the other plunger holes.

In the breakage prevention mechanism 10 of FIGS. 1a, 1b, it is configured so as to express the first pivoting state in which the arm 11 and the crossbar 12 become rotatable in a horizontal direction approximately centered the adapter 13, and the second pivoting state in which the crossbar 12 becomes rotatable in a vertical direction approximately centered at the adapter 13, but it may be configured so that the arm 11 becomes rotatable in a horizontal direction or in a vertical direction approximately centered at the adapter 13. In this case, the arm 11 and the arm connection portion 21 of the adapter 13 are configured to be rotatable around a horizontal direction or a vertical direction.

Moreover, in the breakage prevention mechanism 10 of FIGS. 1a, 1b, it is configured so that the crossbar 12 expresses the sliding state in which the crossbar 12 becomes slidable in the shaft direction of the crossbar, but it may be configured so that the arm 11 itself becomes slidable to the adapter 13, and also the adapter 13 itself becomes slidable. When the arm 11 is made to be slidable to the adapter 13, it is configured so that the arm 11 becomes slidable to the arm connection portion 21 of the adapter 13. Moreover, when the adapter 13 itself is made to be slidable, it is configured so that the arm connection portion 21 and the crossbar connection portion 22 become slidable.

If there is at least one pivoting state and sliding state, the combination of the pivoting and the sliding state can be properly designed based on the needs to be dealt with of the apparatus. Moreover, in the present embodiment, the adapter 13 is separated from the arm 11 and the crossbar 12, and is made to be as a separate member, however the function may be integrated with the arm 11 and (or) the crossbar 12. In this case, the crossbar connection portion becomes being provided in the arm 11, and the arm connection portion becomes being provided in the crossbar 12.

In the above described embodiment, the arm system work transfer apparatus is described, but the breakage prevention mechanism (crossbar connection device) can be used in a feed bar system transfer apparatus. This point is same as the case of a breakage prevention mechanism 51 of FIGS. 8a, 8b, and FIGS. 9a, 9b. In any of the case, it is actualized by replacing the base portion 26 of the arm connection portion 21 of the adapter of FIG. 3 or FIG. 8a, FIG. 9a with the member connected with a feed bar.

Figure 7:
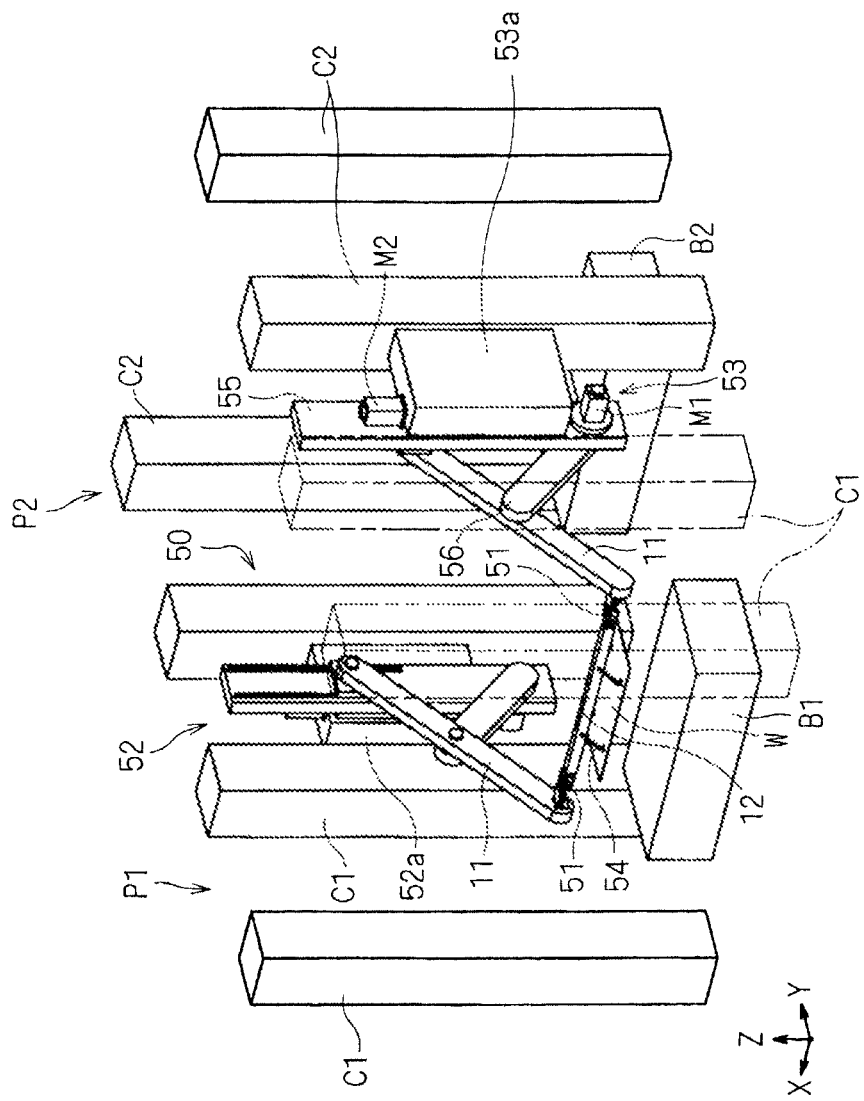
FIG. 7 is an outline perspective view showing the embodiment of the transfer apparatus of the present invention.

An arm system work transfer apparatus 50 shown in FIG. 7 is arranged between an upstream side press machine P2 and a downstream side press machine P1. The four square columns C1 of the left front side of FIG. 7 show the outline of the columns of the downstream side press machine P1, and the four columns C2 of the right back side show the outline of the columns of the upstream side press machine P2. The reference numeral B1, B2 are bolsters mounted on the beds of those press machines P1, P2. The work transfer apparatus 50 comprises the pair of right and left arms (transfer members) 11, the crossbar 12 bridged between those arms 11, the breakage prevention mechanisms (crossbar connection device) 51 which connect end portion of the crossbar 12 to those arms, and right and left drive mechanisms 52, 53 which reciprocatingly swing and move up and down the right and left arms 11. In the crossbar 12, a holding device 54 to hold a work W is provided. As the holding device 54, such as a vacuum cup, an electromagnet etc is adopted. The right and left drive mechanisms 52, 53 are respectively attached to any one of the press machines, for example, the right and left columns C2, C2 of the upstream side press machine P2, and supported.

Each drive mechanism 52, 53 comprises bodies 52a, 53a fixed to the each column C2, C2 of the upstream side press P2, a base 55 provided movably up and down to those bodies, a drive lever 56 of which the lower end is attached to the base 55 rotatably, and the arm 11 of which the upper end is supported to the base 55 slidably and movably up and down, and the central portion of length direction is rotatably connected to the front end of the drive lever 56. The length of the arm 11, is approximately two times of the length of the drive lever 56. The lower end of the drive lever 56 is reciprocatingly swing-driven by a first rotation drive portion M1 consisting of a motor and a reducer. The base 55 is driven up and down to the bodies 52a, 53a by a second rotation drive portion M2 consisting of a motor and a reducer and a rotation-forward movement conversion mechanism L. The rotation-forward movement conversion mechanism L can be constituted by, for example, a screw-nut mechanism etc.

As the motor of the first rotation drive portion M1 and the second rotation drive portion M2, such a motor of which the rotation number or rotation angle is controllable by a predetermined program is adopted. As such a motor, a servo motor is preferable. The position of the front end of each arm 11 can be operated arbitrarily by changing the rotation number or the rotation angle of the first rotation drive portion M1 and the second rotation drive portion M2 by a previously established program, and can be moved through an arbitrary trajectory. Thereby, the work W can be held on the holding device 54 and can be taken out by inserting the crossbar 12 between an upper and a lower die, and can be placed on the die after being taken off from the holding device 54.

The first rotation drive portion M1 and the second rotation drive portion M2 of the right and left drive mechanisms 52, 53 are synchronously controlled so that, generally, the front end of the right and left arms 11 becomes of the same position and of the same angle. However, in this embodiment, for example, the right and left drive mechanisms 52, 53 can be synchronously controlled (programmed) so that the work W is transferred in the state that the right end of the crossbar 12 is inclined back and forth so as to proceed forward, as shown in FIG. 8a. In this case, the lower end of the right and left arms 11 can also be moved horizontally in the same height, and can also be moved changing the right and left heights. In the embodiment shown in FIG. 8b, the right and left arms 11 are synchronously controlled so that the work W is transferred in the state that the crossbar 12 is inclined right and left with the left end of the crossbar 12 becoming higher than the right end. In the present invention, "synchronously" includes the case that the right and left arms 11 are operated concertedly in the state being mutually not aligned.

Figure 9:
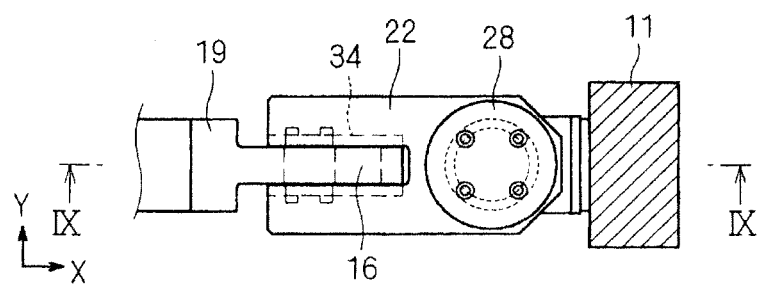
FIG. 9a, 9b are respectively a plan view and a front view showing the other embodiment of the breakage prevention mechanism of the present invention.
Figure 9:
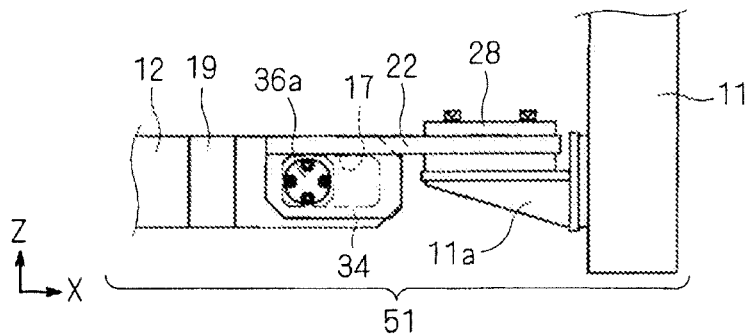

In the crossbar 12 of the work transfer apparatus 50 of FIG. 8a, FIG. 8b, one end is connected to the arm 11 by a breakage prevention mechanism (cross bar connection device) 51 of which the one end is equipped with a slide mechanism, and the other end is connected to the arm 11 by a breakage prevention mechanism 51a not having the slide mechanism. The breakage prevention mechanism 51 equipped with the slide mechanism is, as shown in FIGS. 9a, 9b, same as the breakage prevention mechanism of 10 of FIGS. 1a, 1b in the fundamental configuration thereof. Hence, giving the same reference numeral to the same portion, the detailed description is omitted. In addition, a fixation retention mechanism which fixes the pivoting and the movement such as the slide of each element in a normal state, and shifts to the moving state when an excess force is applied such as the combination etc. of the plunger (reference numeral P of FIG. 1) and the plunger hole (18a, 18b of FIG. 4a), is not provided in the work transfer apparatus 50, since it is usual to synchronously control the right and left drive mechanisms 52, 53 so as to be out of alignment mutually. Moreover, the sensor (reference numeral 14 of FIG. 1a) to detect the shift to the moving state is not equipped.

Figure 10:
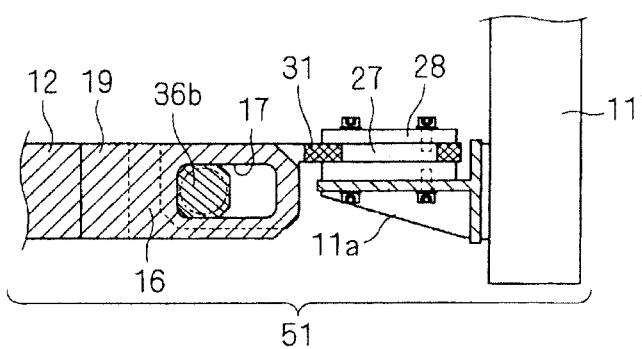
Figure 11:
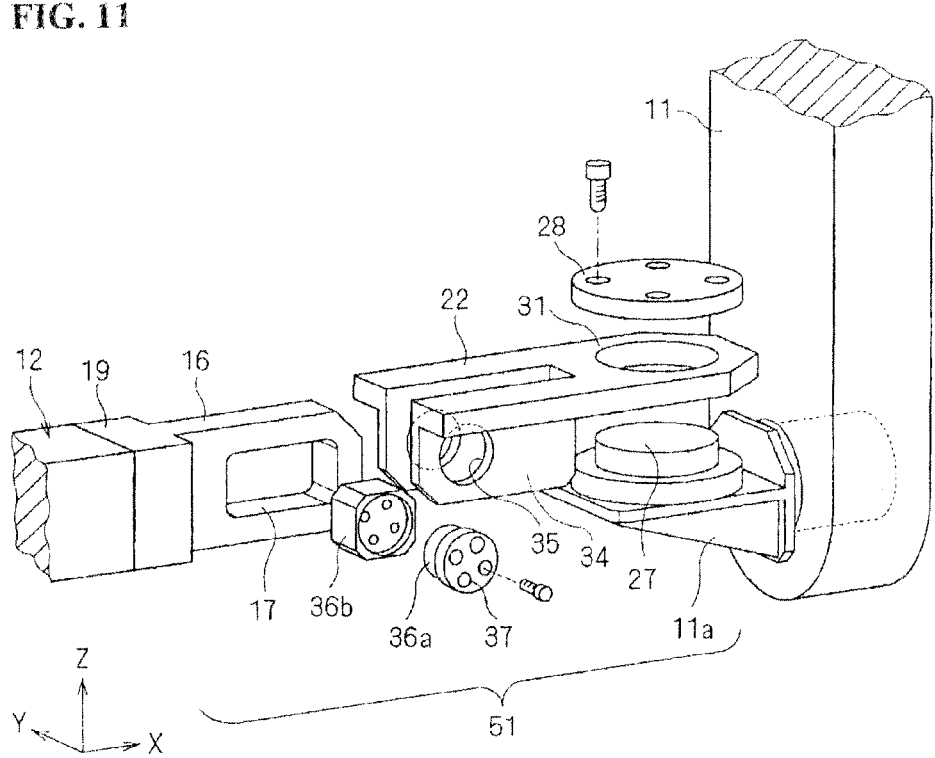
FIG. 11 is a perspective view before assembling of the breakage prevention mechanism of FIG. 9a and FIG. 9b.

As shown in FIG. 10, a rotation shaft 17 which the center line is pointed to the Z axis direction to an adapter connection portion 11a is also provided in the breakage prevention mechanism 51 having the slide mechanism, and the rotation disc 31 of the crossbar connection portion (pivoting block) 22 is fitted in rotatably around the circumference of the rotation shaft 27. And, the both ends 36a of the shaft member 36 is provided rotatably around the Y axis of the work transfer direction and is provided to the through hole 35 of the pair of hem portion 34 of the crossbar connection portion and the rectangular parallelepiped center portion (slide portion) 36b is fitted in the through hole 17 of the crossbar end portion 19 so as to slide. Further, in this embodiment, as shown in FIG. 11, both ends 36a and a center portion 36b of the shaft member 36 are separated, and fixed by a screw etc. Thereby, after inserting the center portion 36b between the pair of hem portions 34, the both ends 36a can be attached to the center portion 36b by inserting the both ends 36a from the outside of the hem portion 34, which makes the assembling work is easy. In addition, an end plate which serves as a retainer of the shaft can be provided integrally in the both ends 36a.

Moreover, the both ends 36a and the center portion 36b can be integrally configured, and the one side of the hem portions 34 can be configured to be separable. Further, the both ends 36a can be made as the shaft member 36 by penetrating the column like shaft through the through hole formed in the block-like center portion 36b, and protruding the both ends 36a from the both sides of the center portion. In this case, at least one side of end plates is attached later. Further, in this case, the center portion 36b can be provided rotatably to the shaft, and the both ends of the shaft can be fixed to the connection body 30.

On the other hand, a breakage prevention mechanism 51a which does not have the slide mechanism shown in the left side of FIGS. 8a, 8b only rotatably connects the crossbar end portion 19 and the pair of the hem portion 34 of the crossbar connection portion 22 around the Y axis with a column like shaft member or a pin 36c, and it does not also have the rectangular through hole 17 and the center portion (slide portion) 36b. In addition, it is possible to adopt a joint which pivots around two axes such as a universal joint which is pivotable around the Y axis and the Z axis.

Figure 12:
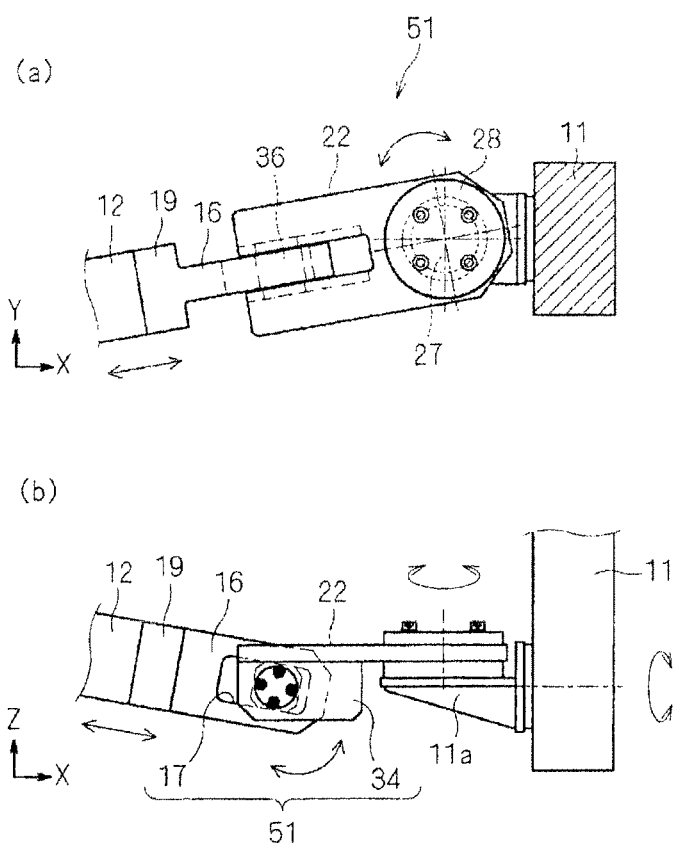
FIGS. 12a, 12b are respectively a plan view and front view showing the bending state of the breakage prevention mechanism of FIG. 9a and FIG. 9b.

In the breakage prevention mechanism 51 configured as described above having the slide mechanism, the crossbar 12 can also pivot around the Z axis, because the crossbar connection portion 22 can pivot around the Z axis to the arm 11, as shown in FIG. 12a. Further, as shown in FIG. 12b, the crossbar 12 can also pivot around the Y axis, because the shaft member 36 or the center portion 36b thereof can pivot around the Y axis to the crossbar connection portion 22. And, since the crossbar end portion 19 can slide in the X axis direction to the shaft member 36, the crossbar 12 can also move in the X direction to the arm 11.

On the other hand, as shown in the left side of FIGS. 8a, 8b, in the breakage prevention mechanism 51a not having the slide mechanism, since the crossbar connection portion 22 is pivotable around the Z axis and the Y axis to the arm 11, the crossbar 12 is also pivotable around the Z axis and the Y axis.

However, the crossbar 12 does not move in the X axis direction the arm 11 because it is not provided with the slide mechanism.

In the transfer apparatus 50 like this, the position in the X axis direction of the end portion of the crossbar 12 is determined at the side where the breakage prevention mechanism 51a not equipped with the slide mechanism is connected, therefore the positioning accuracy of a work is high. And, in the breakage prevention mechanism 51 equipped with the slide mechanism, since the end portion of the arm can move freely in the X axis direction, a work can be transferred while the work is inclined by respectively controlling the swing angle, and up-and-down height of the right and left arm 11 in cooperation. However, when the position accuracy is no so strict, and a large inclination of the crossbar is desired, the right and left end portions may be together connected to each arm 11 by the breakage prevention mechanism 51 equipped with the slide mechanism.

Since the transfer apparatus 50 of FIGS. 9a, 9b makes it fundamental to transfer a work while being inclined, it is not necessary to maintain in a fixed state. Therefore, in the breakage prevention mechanism 51 equipped with the slide mechanism, the fixation retention mechanism such as a plunger, which shifts in to a moving state when an excessive force is applied is not equipped. Moreover, the sensor (refer to reference numeral 14 of FIG. 1a) to detect the shift to the moving state is not equipped.

Figure 13:
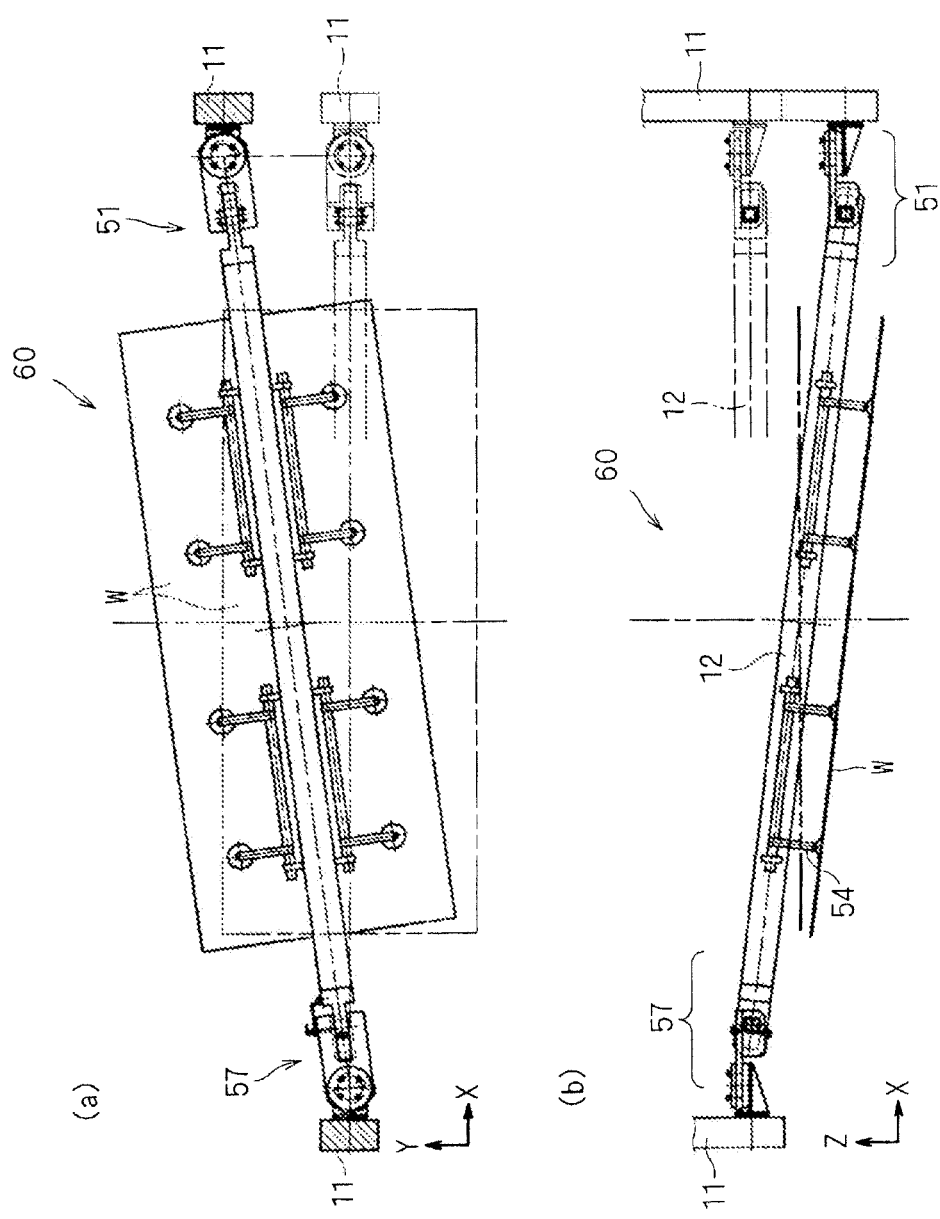
FIGS. 13a, 13b are respectively a substantial plan view and a substantial front view showing the other embodiment of transfer apparatus of the present invention.
Figure 14:
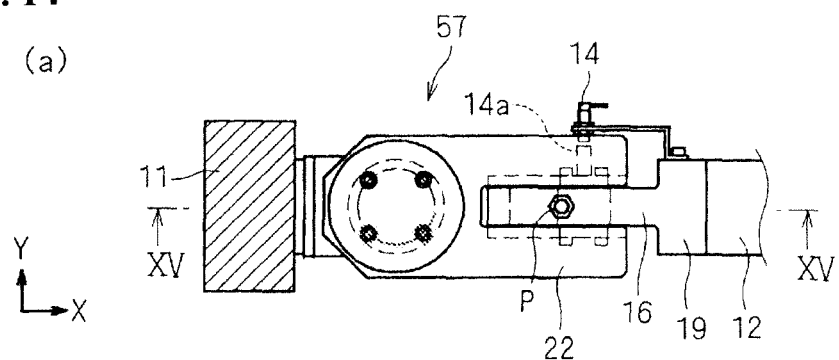
FIGS. 14a, 14b are respectively a plan view and a front view showing the other embodiment of the crossbar connection device of the present invention.
Figure 14:
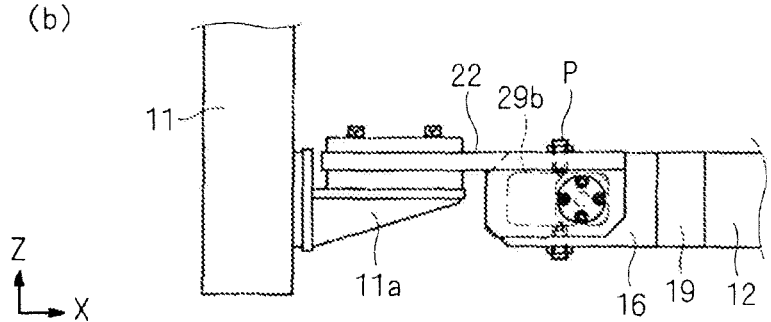
Figure 15:
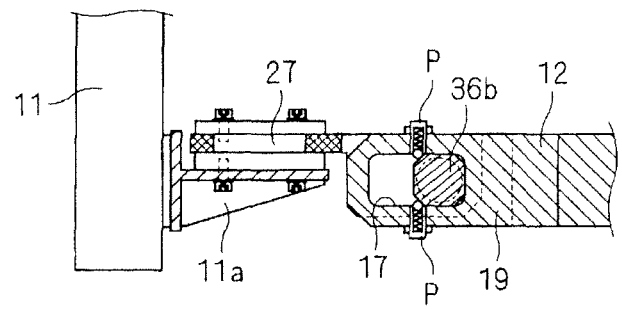

In a transfer apparatus 60 shown in FIGS. 13a, 13b, the both ends of the crossbar 12 are connected to the arm 11 through the breakage prevention mechanisms 51, 57 equipped with the slide mechanism. The breakage prevention mechanism 51 of the right side of FIGS. 13a, 13b is the breakage prevention mechanism 51 of FIGS. 9a, 9b, and FIG. 10. On the other hand, as shown in FIGS. 14a, 14b, the breakage prevention mechanism 51 of the left side is equipped with the fixation retention mechanism consisting of the plunger P which allows pivoting around the two axes of the Y axis and the Z axis and constrains the movement in the sliding direction is provided. In this breakage prevention mechanism 57, the plunger P is made to detect the end surface of the shaft member 36 since it only detects the presence or absence of slide, which is different from the breakage prevention mechanism 10 of FIGS. 1a, 1b. Thereby, it is possible to exert the fixation retaining effect with fewer number of the plunger P, making the plunger hole not necessary. In addition, the reference numeral 14a is a sensor detection member (dog) which is the object of detection of the displacement sensor 14.

Figure 16:
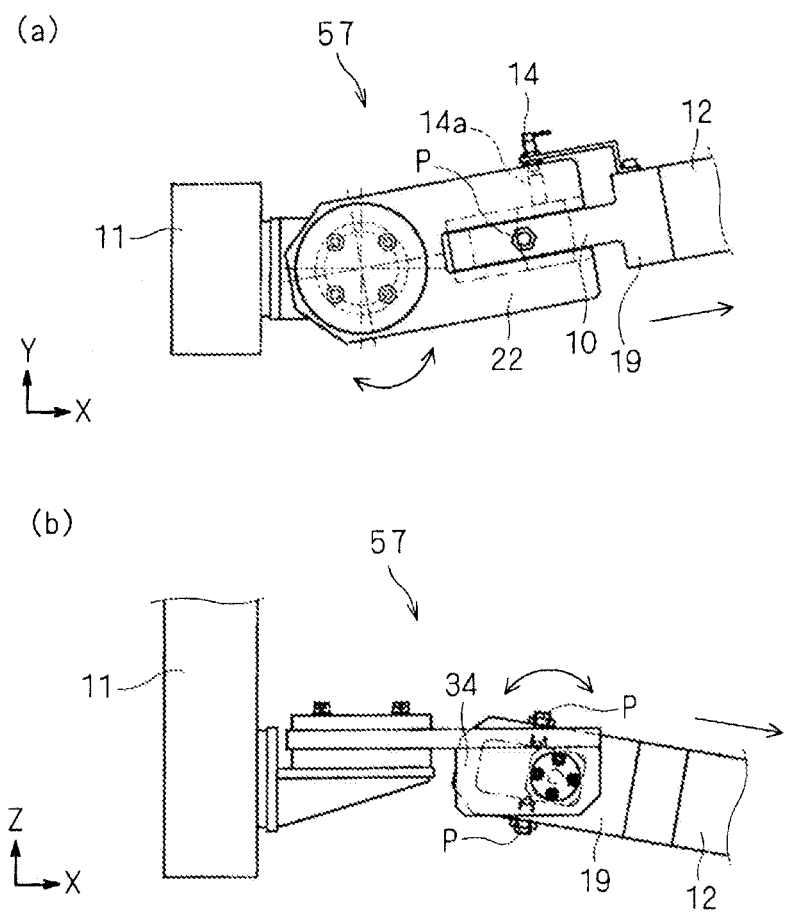
FIGS. 16a, 16b are respectively a plan view and a front view showing the bending state of the breakage prevention mechanism of FIG. 14a and FIG. 14b.

The breakage prevention mechanism 57 provided with this plunger P and the sensor 14 can pivot around the Z axis shown in FIG. 16a, and can pivot around the Y axis as shoe in FIG. 16b even in the normal state. However, in the normal state, the relative movement in the X axis direction between the crossbar 12 and the arm 11 is constrained, since the plunger P constrains slide movement. Hence, the one end of the crossbar 12 can be positioned, making it possible to accurately determine the position of the holding device 54 and the work W. In this case, in the breakage prevention mechanism (right side of FIG. 13a) 51 which does not have the fixation retention mechanism, the end portion of the crossbar 12 slides freely. Hence, the transfer apparatus 60 can transfer the work while being inclined.

And, if an excessive force beyond the scope of the assumption is applied, the constraint by the plunger P is released shifting to the slidable state namely, the sliding state in the breakage prevention mechanism 57 equipped with the fixation retention mechanism (left side of FIG. 13a). Thereby, the breakage of the crossbar 12 etc. is prevented. Further, since the sensor 14 of FIG. 16a detects the shift to the sliding state, a proper response such as to stop the transfer apparatus 60 or the press line can be addressed. Stated differently, in the transfer apparatus 60 of FIGS. 13a, 13b, the breakage prevention mechanism 57 equipped with the plunger P and the displacement sensor of FIGS. 14a, 14b is provided in the one end (left side) of the crossbar 12, and the crossbar connection device 51 not equipped with the plunger P or the displacement sensor of FIGS. 9a, FIG. 9b is provided in another end. In the transfer apparatus like this, when the front end position of the right and left arms 11 differs beyond the assumption, and not being possible to absorb the difference only by the one side, the plunger P becomes disengaged and generates relative movement, thereby the displacement sensor 14 can detect the right and left displacement.

The invention claimed is:

1. A breakage prevention mechanism of a crossbar system transfer apparatus, comprising;
    a pair of transferring members that is synchronized and moves in approximately parallel with each other,
    a crossbar connected with the pair of transferring members so as to be bridged between the pair of transferring members,
    a pivoting block provided so as to be pivotable around a Z axis of an approximately vertical direction to a Y axis of a work transfer direction, and
    a slide block fixed to an end portion of the crossbar, wherein
    both ends of the crossbar and the transferring member express a pivoting state being pivotable around the Z axis and the Y axis, and being approximately centered at a connection portion of the transferring member and the crossbar,
    at the same time, at least one end of the crossbar in the connection portion expresses a sliding state being slidable in an X axis of the axis direction of the crossbar to the transferring member,
    a through groove extending in the X axis direction to which the crossbar is extended is formed in one of the pivoting block and the slide block, and a pivoting support portion is provided in the other of the pivoting block and the slide block, and
    a slide member is supported by the pivoting support portion so as to be pivotable, and the slide member is fitted to the through groove so as to be slidable.

2. The breakage prevention mechanism according to claim 1, wherein only one end of the crossbar is connected slidably in the X axis to the transferring member, another end being not slidable.

3. The breakage prevention mechanism according to claim 1, wherein the both ends of the crossbar are respectively connected slidably in the X axis to the transferring member.

4. The breakage prevention mechanism according to claim 3, further comprising a fixation retention mechanism, being inserted in the pivoting block, which constrains the slide of the pivoting block and the crossbar in a normal state and releases the constraint by an external force.

5. The breakage prevention mechanism according to claim 4, wherein the fixation retention mechanism further constrains the pivoting of the crossbar and the transferring member, and release the constraint by the external force.

6. The breakage prevention mechanism according to claim 4, wherein a sensor to detect the displacement of the transferring member and/or the crossbar from the normal state is equipped.

7. A breakage prevention mechanism of a crossbar system transfer apparatus configured to transfer a work from an upstream press machine to a downstream press machine, comprising:
    a pair of transferring members that is synchronized and moves in approximately parallel with each other,
    a crossbar connected between the pair of transferring members,
    a pivoting block connected between the crossbar and one of the pair of transferring members, the pivoting block being rotatable around an axis extending in a first direction vertical to a surface of a bolster in the upstream or downstream press machine, and
    a shaft member extending in a direction perpendicular to both of the first direction and a second direction in which the crossbar extends, the shaft member being held by the crossbar and the pivoting block so that at least one of the crossbar and the pivoting block pivots around the shaft member relative to the other of the crossbar and the pivoting block in a pivoting state, and so that at least one of the crossbar and the pivoting block slides relative to the other of the crossbar and the pivoting block in a sliding state, wherein
    the transferring member and the crossbar are fixed by the pivoting block in a normal state, and
    the transition from the normal state to the pivoting state and/or the sliding state is made by receiving a predetermined external force.

8. The breakage prevention mechanism according to claim 7, further comprising a transferring member connecting portion that is connected between the transferring member and the pivoting block.

9. The breakage prevention mechanism according to claim 7, wherein the pivoting block and transferring member or the pivoting block and the crossbar in the normal state are fixed by a plunger, a shear pin, or a frictional force.

10. The breakage prevention mechanism according to claim 7, wherein a sensor to detect the displacement of the transferring member and/or the crossbar from the normal state is equipped.

11. A crossbar system transfer apparatus configured to transfer a work from an upstream press machine to a downstream press machine, comprising:
    a pair of transferring members that is synchronized and moves in approximately parallel with each other;
    a crossbar connected between the pair of transferring members;
    a pivoting block connected between the crossbar and one of the pair of transferring members, the pivoting block being rotatable around an axis extending in a first direction vertical to a surface of a bolster in the upstream or downstream press machine; and
    a shaft member that penetrates through a first hole of an end portion of the crossbar and a second hole of the pivoting block, the first hole being elongated along a second direction in which the crossbar extends and the second hole being circular.

12. The crossbar system transfer apparatus according to claim 11, wherein
    the shaft member slides in the first hole, along the second direction, and
    the shaft member rotates in the second hole, around a direction perpendicular to both of the first and second directions.

13. The crossbar system transfer apparatus according to claim 11, wherein
the crossbar slides toward the transferring member, and
the crossbar rotates around the shaft member.

14. The crossbar system transfer apparatus according to claim 11, wherein the crossbar rotates around the first direction.

15. The crossbar system transfer apparatus according to claim 11, wherein the shaft member slides in the first hole, along the second direction, and the shaft member rotates in the first hole and/or the second hole.

* * * * *